May 25, 1965  B. L. JONES  3,184,825
SCALE BREAKER
Filed March 25, 1963
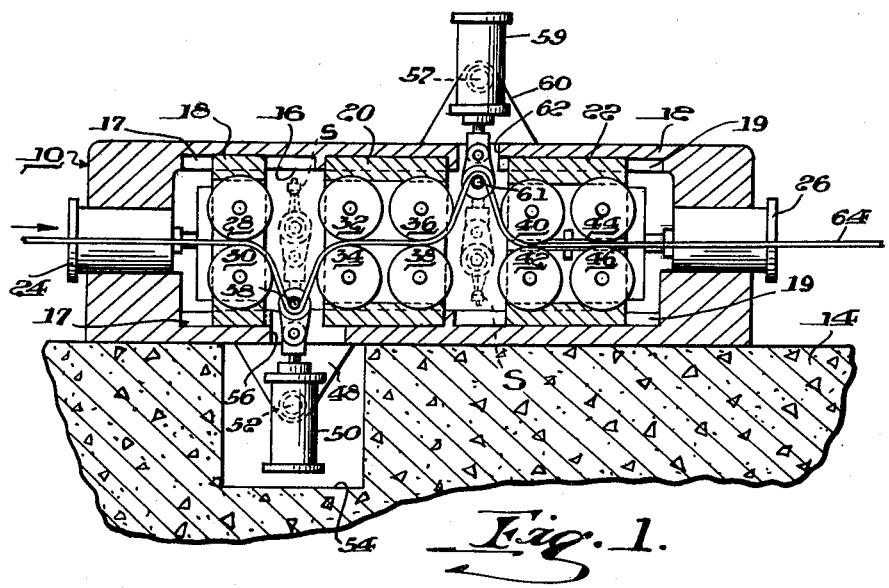
Fig. 1.
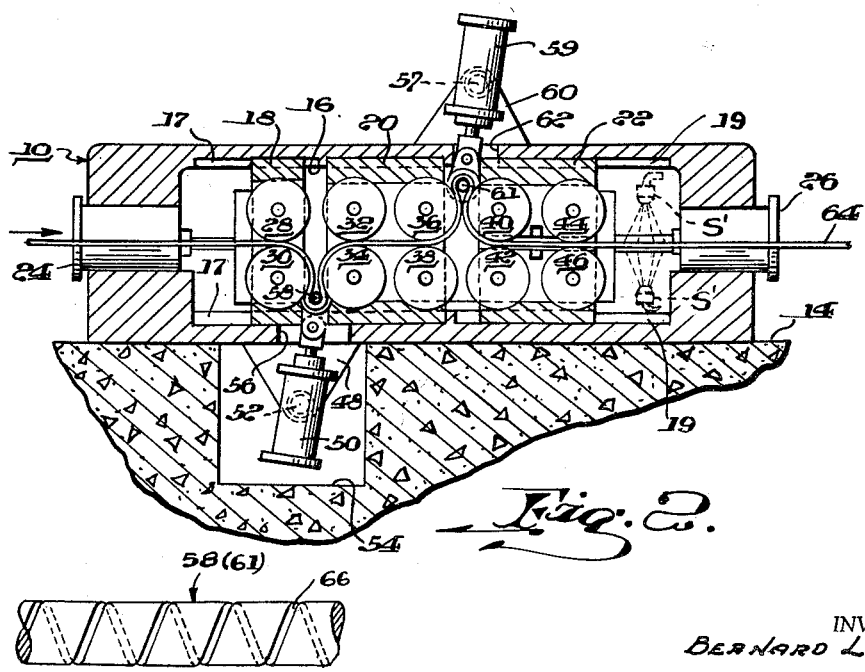
Fig. 2.
Fig. 3.
INVENTOR.
BERNARD L. JONES.
BY
Thomas H. Murray
his
ATTORNEY 3,184,825
SCALE BREAKER
Bernard L. Jones, Matanzas, Venezuela
(Kennilworth Apts., 5700 Center Ave., Pittsburgh, Pa.)
Filed Mar. 25, 1963, Ser. No. 271,038
6 Claims. (Cl. 29—81)

This invention relates to an improvement in apparatus for the breaking of scale during a strip mill operation. More particularly, the invention relates to a method and apparatus whereby scale can be removed from steel strip material completely and efficiently.

In the processing of steel strip material, a scale of oxides is formed on the strip during processing steps requiring heating of the material. This scale must be removed since otherwise it will be carried through to appear on the surface of the finished product, a result which is highly undesirable. In order to remove the scale, the steel strip material is passed through a scale breaker which comprises a series of rolls around which the strip passes in order to bend and stretch it and thus loosen the scale. In the usual case the strip, which is under tension, is passed over a small diameter scale breaking roll supported along its length by line contact with one or more large diameter back-up rolls. In this process, the outer surface of the strip is stretched, and the scale thus broken, in passing over the small diameter roll.

One difficulty encountered in prior art scale breakers of this type is due to differentials in tension across the strip width. That is, steel strip material is not exactly flat and may, for example, be thicker on one side than on the other. When such strip is pulled over a small diameter scale breaking roll, greater tension will be applied to the thicker side. This not only results in an uneven scale breaking effect across the strip width, but also tends to skew or twist the scale breaking roll in its bearing supports and possibly alter the desired line-contact relationship between the scale breaking and back-up rolls.

As an overall object, the present invention seeks to provide a method and apparatus for scale breaking wherein the foregoing difficulties are minimized or entirely eliminated. This is accomplished by providing a scale breaking arrangement wherein the tension on the strip itself tends to pull the small diameter scale breaking roll into a seating or nesting relationship with respect to back-up rolls such that twisting or skewing of the scale breaking roll cannot occur.

Another object of the invention is to provide a plurality of rolls which direct the steel strip in such manner that the strip is passed around a small diameter roll through an arc greater than 180° to thereby achieve a self-seating effect of the small diameter roll with respect to back-up rolls as well as a reverse bending effect. That is, as the strip passes around the scale breaking roll through an arc greater than 180°, it is first bent in one direction, then in the other direction, and finally again in the first direction before it leaves the roll.

Still another object of the invention is to provide an arrangement of the type described wherein the scale breaking roll requires very little external bearing support because of the self-seating or nesting effect referred to above, the arrangement also providing for easy replacement or changing in size of scale breaking rolls.

In accordance with the invention, the strip is passed around an arc greater than 180° by initially passing it around an arcuate portion of a back-up roll, thence around a small diameter scale breaking roll, and finally around an arcuate portion of a second back-up roll, the spacing between the back-up rolls being such that the tension on the strip will tend to pull the scale breaking roll into snug abutting line-contact relationship with the back-up rolls. In contrast to prior art scale breakers, the arrangement of the invention, which facilitates pulling of the scale breaking roll into a seating or nesting effect with respect to the back-up rolls due to the tension in the strip itself, provides for a more uniform and complete scale breaking effect and eliminates problems occurring as a result of skewing or twisting of the scale breaking roll. Furthermore, the invention facilitates an extremely small diameter scale breaking roll with a resultant better scale breaking effect.

With these and other objects and features in view, the invention consists in the construction, arrangement and combination of the various parts of the device and the method hereinafter set forth, whereby the objects and features contemplated are attained as hereinafter more fully set forth, pointed out in the claims and illustrated in the accompanying drawings, in which:

FIGURE 1 is a vertical cross-sectional view through the apparatus of the invention showing the apparatus prior to actual scale breaking operations;

FIG. 2 is a vertical cross-sectional view through the apparatus of the invention during a scale breaking operation; and FIG. 3 is a fragmentary side view schematically illustrating a helical groove provided on a scale breaker roll.

Referring now to the drawings, FIGS. 1 and 2 show the apparatus of the invention generally designated as 10 and comprising a stand 12 supported on a foundation 14. Provided in the stand 12 is an elongated opening 16 which carries three crossheads 18, 20 and 22. As shown, the crossheads 18 and 22 are supported in guideways 17 and 19 respectively for reciprocable movement toward and away from the center crosshead 20 which is stationary. Reciprocation of the crosshead 18 is effected by a pair of cylinders disposed on either side of the stand 12, only one cylinder 24 being shown in the cross-sectional view of FIG. 1. Similarly, reciprocation of the slideable crosshead 22 is effected by means of a second pair of hydraulic cylinders, only one of such cylinders 26 being shown.

Carried on the crosshead 18 are a pair of rolls 28 and 30. In a somewhat similar manner, pairs of rolls 32, 34 and 36, 38 are carried on the stationary crosshead 20. Finally, pairs of rolls 40, 42 and 44, 46 are carried on the slideable crosshead 22. At least part of the rolls 28–46 are driven by means, not shown, to thereby force strip material through the scale breaker in the manner hereinafter described. The working gap between each pair of rolls preferably is adjustable to correspond to the thickness of the strip material passing therethrough. Any well known conventional means may be employed to accomplish this result.

Between the crossheads 18 and 20 on either side of stand 12 are brackets 48 which carry a pair of hydraulic cylinders 50, only one of such cylinders being shown in FIGS. 1 and 2. The cylinders 50 are pivotally mounted on the brackets 48 as at 52 and extend downwardly into a pit 54 provided in foundation 14. The piston rods of cylinders 50 extend through an opening 56 in the stand 12 and carry an assembly including a small diameter scale breaking roll 58, this roll being supported at its opposite ends by bearings carried by clevises on the ends of the piston rods. As shown, the scale breaking roll 58 can be moved from the solid-line position shown in FIG. 1 to the dotted-line position, and vice versa. A second pair of hydraulic cylinders 59 are pivotally carried at 57 on brackets 60 on the top of the stand 12 at either side thereof and are provided with piston rods and clevises which carry an assembly including a second scale breaking roll 61 which may be moved through opening 62 from the solid to the dotted-line positions shown in FIG. 1.

In the operation of the device, the four cylinders 50 and 59, only two of which are shown in FIGS. 1 and 2, are pressurized to move the scale breaking rolls 58 and 61 into the dotted-line positions illustrated in FIG. 1. Thereafter, metal strip material 64 is threaded through the scale breaker by inserting it into the pass defined between rolls 28 and 30, underneath the scale breaking roll 58, through the roll passes defined between rolls 32, 34 and 36, 38, over the small diameter scale breaking roll 61, and through the roll passes defined between rolls 40, 42 and 44, 46. During threading, the slideable crossheads 18 and 22 are retracted into the positions shown in FIG. 1. After the strip 64 is thus threaded through the scale breaker, the cylinders 50 and 59 are pressurized in opposite directions to move scale breaking roll 58 downwardly and roll 61 upwardly into the full-line positions shown in FIG. 1, thereby bending the strip material 64 around these rolls and into substantially V-shaped configurations. Finally, the pairs of cylinders 24 and 26 on opposite sides of the strip 64 are pressurized to move the crossheads 18 and 22 inwardly toward the stationary crosshead 20 and into the positions shown in FIG. 2. It will be noted that in this process the cylinders 50 and 59 will necessarily pivot around points 52 and 57. When the crossheads 18 and 22 are thus moved inwardly toward crosshead 20, the strip material 64 is effectively bent around the scale breaking rolls 58 and 61 through arcs greater than 180° with the result that the strip, in passing around the scale breaking rolls, is first bent in one direction, then in the other direction, and again in the first direction. Note that one side of the strip is in engagement with roll 58 while the other side is in engagement with roll 61, meaning that the bending effect of one roll is reversed with respect to that of the other roll. That is, as the strip passes around roll 58, one side of the strip surface is stretched to break the scale; whereas the other side is stretched to break scale in passing over roll 61.

Since the strip 64 is under tension, as will be described later such tension tends, for example, to pull roll 58 into snug abutting line-contact relationship with its back-up rolls 30 and 34 as viewed in FIG. 2. The same applies to roll 61 in that it is pulled into snug abutting relationship with its back-up rolls 36 and 40. Furthermore, since the rolls 58 and 61 are effectively nested between their associated back-up rolls, they cannot twist or skew due to differentials in tension across the width of the strip, the result being that, in contrast to prior art arrangements, line contact of the rolls 58 and 61 with the back-up rolls 30, 34 and 36, 40 respectively is always insured. Finally, the arrangement eliminates the need for costly high strength bearings at the opposite ends of rolls 58 and 61 since the major bearing support is provided on the back-up rolls. If necessary, thrust bearings, not shown, may be provided at the ends of rolls 58 and 61 to take lateral thrusts.

As will be understood, scale will collect around the rolls 58 and 61 during a scale breaking operation. This may be removed, for example, by high pressure water sprays indicated in dotted outline at S in FIG. 1 directed toward both sides of the strip as it passes around rolls 58 and 61 or by sprays indicated in dotted outline at S' in FIG. 2, directed toward both sides of the strip as it exits from the rolls 44, 46. If necessary or desirable, a helical groove 66 could be provided in the surface of each roll 58 and 61 as schematically illustrated in FIG. 3, such that upon rotation of the rolls, the scale would follow the grooves to the sides of the rolls where it can be removed.

Preferably, the rolls on crossheads 18, 20 and 22 are driven independently so that the rolls on crosshead 20, for example, can be driven a little faster than those on crosshead 18; and the rolls on crosshead 22 can be driven faster than those on crosshead 20. In this manner tension or stretch can be created in the strip at the breaker areas.

Although the invention has been shown in connection with a certain specific embodiment, it will be readily apparent to those skilled in the art that various changes in form and arrangement of parts may be made to suit requirements without departing from the spirit and scope of the invention. In this respect, it is apparent that the invention could also be used as an effective processor or leveler as well as a scale breaker.

I claim as my invention:

1. In the method for removing scale from metal strip having scale on its surfaces, the steps of passing the strip through a substantially flat planar path over a small diameter scale breaking roll having a pair of large diameter back-up rolls on either side thereof, the axes of said back-up rolls being parallel with the axis of the scale breaking roll, the scale breaking roll being on one side of a plane extending through the axes of the back-up rolls and with one side of the strip facing the scale breaking roll and the other side facing said back-up rolls, moving the scale breaking roll between the back-up rolls to a point on the other side of said plane extending through the axes of the back-up rolls to bend the strip into a general V-shape between the back-up rolls, and finally moving at least one of said back-up rolls toward the other back-up roll whereby the back-up rolls will engage said V-shaped configuration to cause the strip to pass around said scale breaking roll through an arc greater than 180°.

2. A method for removing scale from metal strip material having scale on its surfaces comprising the steps of passing the strip material between spaced pairs of parallel relatively large diameter rolls and over a relatively small diameter scale breaking roll which is positioned between the pairs of rolls and substantially midway between an upper and lower roll in each pair, thereafter moving said scale breaking roll in a vertical direction to bend said strip into a generally V-shaped configuration, and finally moving at least one pair of rolls toward the other pair of rolls whereby one roll in each pair of rolls will engage said generally V-shaped configuration and cause the strip to pass around said scale breaking roll through an arc greater than 180°.

3. A method for removing scale from metal strip material having scale on its surfaces comprising the steps of passing the strip material between spaced pairs of parallel relatively large diameter rolls and over a relatively small diameter scale breaking roll, the axes of the rolls in each pair lying in common vertical planes and the scale breaking roll being positioned between the pairs of rolls and substantially midway between the axes of the respective rolls in each pair, thereafter moving said scale breaking roll in a vertical direction to bend said strip into a generally V-shaped configuration, and finally moving at least one pair of rolls toward the other pair of rolls whereby one roll in each pair of rolls will engage said generally V-shaped configuration and cause the strip to pass around said scale breaking roll through an arc greater than 180°.

4. Apparatus for removing scale from metal strip comprising a plurality of pairs of rolls, said pairs of rolls defining linearly aligned roll passes for the reception of metal strip material, at least one of said pairs of rolls being movable toward and away from a stationary pair of rolls adjacent thereto, at least one additional roll being positioned between said movable pair of rolls and said stationary pair of rolls, said single roll being arranged to reciprocate in a direction perpendicular to a plane extending through said linearly aligned roll passes, means for reciprocating said movable pair of rolls toward and away from said stationary pair of rolls, and means for reciprocating said single roll in said perpendicular direction, whereby a strip of metal may be inserted between said pairs of rolls, said single roll may be moved in said perpendicular direction to force said strip of metal into a generally V-shaped configuration, and said movable pair of rolls may be moved toward said stationary pair of rolls to force said strip of metal to pass around said single roll through an arc greater than 180°.

5. Apparatus for breaking scale from metal strip material comprising three sets of rolls, a first of said sets of rolls including a pair of rolls mounted in a member arranged for horizontal reciprocating movement, the second set of rolls including a pair of rolls mounted in a stationary member, the third set of rolls including a pair of rolls mounted in a member for horizontal reciprocating movement, all of said pairs of rolls being so positioned that the passes between the rolls of each pair of rolls are aligned in a substantially horizontal plane, a first scale breaking roll positioned between said first set of rolls and said second set of rolls, said first scale breaking roll being arranged to reciprocate in a direction perpendicular to the plane of the passes of said pairs of rolls, a second scale breaking roll positioned between said second set of rolls and the third set of rolls, said second scale breaking roll also being arranged to reciprocate in a direction perpendicular to the plane of the passes of said pairs of rolls, means for reciprocating said first set of rolls toward and away from said second set of rolls, means for reciprocating said third set of rolls toward and away from said second set of rolls, means for reciprocating said first scale breaking roll in said perpendicular direction, and means for reciprocating said second scale breaking roll in said perpendicular direction, whereby a strip of metal may be threaded through said pairs of rolls, said scale breaking rolls may be moved in said perpendicular direction to form said strip of metal into V-shaped configurations, and said first and third sets of rolls may be moved toward the second stationary pair of rolls to force said strip of metal to attain an arc greater than 180° around each of said first and second scale breaking rolls.

6. Apparatus for removing scale from metal strip comprising three sets of rolls, the first of said sets of rolls including a pair of rolls mounted in a member for horizontal reciprocating movement, the second set of rolls including a pair of rolls mounted in a stationary member, the third set of rolls including a pair of rolls mounted in a member for horizontal reciprocating movement, all of said pairs of rolls being so positioned that the passes between the rolls of each pair of rolls are aligned in a single horizontal plane, a first scale breaking roll positioned between said first set of rolls and said second set of rolls, said first scale breaking roll being arranged to reciprocate in a direction perpendicular to the plane of the passes of the pairs of rolls, a second scale breaking roll positioned between said second set of rolls and said third set of rolls, said second scale breaking roll also being arranged to reciprocate in a direction perpendicular to the plane of said passes of the pairs of rolls, hydraulic cylinder means for reciprocating said first set of rolls toward and away from said second set of rolls, hydraulic cylinder means for reciprocating said third set of rolls toward and away from said second set of rolls, hydraulic cylinder means for forcing said first scale breaking roll downwardly in said perpendicular direction, and hydraulic cylinder means for forcing said second scale breaking roll upwardly in said perpendicular direction, whereby said metal strip may be threaded through said pairs of rolls, said first scale breaking roll may be forced downwardly to form said strip of metal into a generally V-shaped configuration, said second scale breaking roll may be forced upwardly to form said strip of metal into an inverted V-shaped configuration, and said first and third sets of rolls may be moved toward the second stationary pair of rolls to force said strip of metal to attain an arc greater than 180° around each of said scale breaking rolls.

References Cited by the Examiner

UNITED STATES PATENTS

| 766,517 | 8/04 | Palmer | 26—1 |
| 2,291,361 | 7/42 | Walsh | 184—4 |
| 2,723,441 | 11/55 | Groce | 28—35 |
| 2,857,655 | 10/58 | Greenberger. | |
| 2,927,364 | 3/60 | Adams | 28—28 |

FOREIGN PATENTS

| 458,954 | 8/13 | France. |
| 1,145,399 | 5/57 | France. |
| 356,173 | 7/22 | Germany. |

WALTER A. SCHEEL, *Primary Examiner.*

JOSEPH D. BEIN, *Examiner.*